(12) United States Patent
Chou et al.

(10) Patent No.: US 11,287,927 B2
(45) Date of Patent: Mar. 29, 2022

(54) COORDINATE DETECTION METHOD

(71) Applicant: Wacom Co., Ltd., Saitama (JP)

(72) Inventors: Chin-Chuan Chou, Taipei (TW); Chengliang Hsieh, Taipei (TW); Shigeyuki Sano, Saitama (JP); Jui Min Liu, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/174,134

(22) Filed: Feb. 11, 2021

(65) Prior Publication Data

US 2021/0165522 A1    Jun. 3, 2021

Related U.S. Application Data

(63) Continuation of application No. PCT/JP2019/024191, filed on Jun. 19, 2019.

(30) Foreign Application Priority Data

Sep. 27, 2018   (JP) .............................. JP2018-181398

(51) Int. Cl.
*G06F 3/041* (2006.01)
*G06F 3/044* (2006.01)
*G06F 3/0354* (2013.01)

(52) U.S. Cl.
CPC ........ G06F 3/0418 (2013.01); G06F 3/03545 (2013.01); G06F 3/0446 (2019.05)

(58) Field of Classification Search
CPC ... G06F 3/0418; G06F 3/0446; G06F 3/03545
See application file for complete search history.

(56) References Cited

U.S. PATENT DOCUMENTS

| 5,736,980 | A | 4/1998 | Iguchi et al. | |
|---|---|---|---|---|
| 2013/0082976 | A1* | 4/2013 | Kang | G06F 3/0488 345/174 |
| 2014/0081588 | A1* | 3/2014 | Tien | G01S 5/0247 702/94 |
| 2015/0338932 | A1 | 11/2015 | Pant et al. | |
| 2016/0154528 | A1 | 6/2016 | Ahn | |

(Continued)

FOREIGN PATENT DOCUMENTS

| EP | E P-2575013 A2 * | 4/2013 | ........... G06F 3/0418 |
|---|---|---|---|
| JP | 07-152475 A | 6/1995 | |

(Continued)

OTHER PUBLICATIONS

International Search Report, dated Sep. 24, 2019, for International Application No. PCT/JP2019/024191, 5 pages. (With English translation).

*Primary Examiner* — Michael Pervan
(74) *Attorney, Agent, or Firm* — Seed IP Law Group LLP (57) ABSTRACT

A coordinate detection method includes detecting coordinates corresponding to a position of a pen tip electrode of a pen by detecting distribution of signal levels in a plane of a touch surface through use of a plurality of linear electrodes disposed in the plane of the touch surface; detecting tilt data indicating a tilt of the pen; and acquiring a correction amount corresponding to a combination of the coordinates and the tilt data by referencing a correction table defining a correspondence between correction amounts and combinations of coordinates and tilt data.

5 Claims, 6 Drawing Sheets

(56) References Cited

U.S. PATENT DOCUMENTS

| | | | |
|---|---|---|---|
| 2016/0246389 A1 | 8/2016 | Munakata et al. | |
| 2016/0306496 A1 | 10/2016 | Ishikawa et al. | |
| 2017/0068330 A1* | 3/2017 | Navidpour | G06F 3/04182 |

FOREIGN PATENT DOCUMENTS

| | | | |
|---|---|---|---|
| JP | 07-319603 A | 12/1995 | |
| JP | 09-230989 A | 9/1997 | |
| JP | 2008-090565 A | 4/2008 | |
| JP | 2014-139759 A | 7/2014 | |
| JP | 2016-153954 A | 8/2016 | |
| WO | WO-2014080864 A1 * | 5/2014 | G06F 3/03545 |
| WO | 2014/174772 A1 | 10/2014 | |

* cited by examiner

| COORDINATES x | CORRECTION AMOUNT Δx |
|---|---|
|  |  |
|  |  |
|  |  |
|  |  |
|  |  |
|  |  |
|  |  |
|  |  |

FIG. 7B

| COORDINATES y | CORRECTION AMOUNT Δy |
|---|---|
|  |  |
|  |  |
|  |  |
|  |  |
|  |  |
|  |  |
|  |  |
|  |  |

FIG. 8

COORDINATE DETECTION METHOD

BACKGROUND

Technical Field

The present disclosure relates to a coordinate detection method and, more particularly, to a coordinate detection method for detecting the coordinates of a pen in the plane of a touch surface.

Background Art

There is known a position detection device for detecting the coordinates of a pen in the plane of a touch surface. This type of position detection device is built, for example, in a tablet terminal and used to implement pen input to the touch surface.

The position detection device is configured to detect the coordinates of the pen by detecting a distribution of signal levels in the plane of the touch surface through the use of a plurality of linear electrodes extensively laid in the plane of the touch surface. Signals to be detected may be pen signals transmitted from the pen through a pen tip electrode or signals for finger touch detection (signals generated in the position detection device). These two different types of signals are configured to flow between the pen and the position detection device through capacitance formed between the pen tip electrode and the linear electrodes.

In the above case, the coordinates detected based on the above "distribution" alone are not correct in a strict sense because of fluctuations in the positions and shapes of the linear electrodes. Therefore, in the past, a correction table defining the correspondence between the coordinates and correction amounts has been used to perform a process of correcting the coordinates detected based on the "distribution." An example of the position detection device configured to make such corrections is disclosed in U.S. Patent Application Publication No. 2015/0338932.

Moreover, in reality, the pen tip electrode is not a point, but a three-dimensional object with an extension. Further, the pen tip electrode needs to be relatively large in size in order to provide sufficient capacitance between the pen tip electrode and the linear electrodes. Therefore, if the pen is tilted, an error occurs in the detected coordinates. In view of such circumstances, a technology for correcting the coordinates of the pen according to the tilt of the pen is disclosed in Japanese Patent Laid-open No. 2014-139759 and Japanese Patent Laid-open No. 2008-090565. Further, a technology for correcting an error caused by parallax is disclosed in Japanese Patent Laid-open No. Hei 7-152475.

However, using a conventional method of using the above-mentioned correction table may cause a problematic situation where a significant error occurs in the correction amount outputted from the correction table. More specifically, although an error occurs in the detected coordinates as described above when the pen is tilted, the conventional method references the correction table according to such erroneously detected coordinates. This results in a significant error in the correction amount outputted from the correction table.

BRIEF SUMMARY

In view of the above circumstances, the present disclosure has been made in order to provide a coordinate detection method capable of reducing an error that occurs in the correction amount outputted from the correction table due to the tilt of the pen.

According to a first aspect of the present disclosure, there is provided a coordinate detection method including detecting coordinates corresponding to a position of a pen tip electrode of a pen by detecting distribution of signal levels in a plane of a touch surface through use of a plurality of linear electrodes disposed in the plane of the touch surface; detecting tilt data indicating a tilt of the pen; and acquiring a correction amount corresponding to a combination of the coordinates and the tilt data by referencing a correction table defining a correspondence between correction amounts and combinations of coordinates and tilt data.

According to a second aspect of the present disclosure, there is provided a coordinate detection method including detecting coordinates corresponding to a position of a pen tip electrode of a pen by detecting a distribution of signal levels in a plane of a touch surface through use of a plurality of linear electrodes disposed in the plane of the touch surface; detecting tilt data indicating a tilt of the pen; acquiring intermediate coordinates by correcting the detected coordinates according to the tilt data; and acquiring a correction amount corresponding to the intermediate coordinates by referencing a correction table defining a correspondence between correction amounts and coordinates.

The first aspect of the present disclosure uses a correction table that defines the correspondence between correction amounts and combinations of coordinates and tilts instead of a correction table that defines the correspondence between correction amounts and coordinates. This makes it possible to reduce an error that occurs in a correction amount outputted from the correction table due to the tilt of the pen.

The second aspect of the present disclosure corrects the detected coordinates according to the tilt data before referencing the correction table. This makes it possible to reduce an error that occurs in a correction amount outputted from the correction table due to the tilt of the pen.

DETAILED DESCRIPTION OF THE PREFERRED EMBODIMENTS

Embodiments of the present disclosure will now be described in detail with reference to the accompanying drawings.

Figure 1:
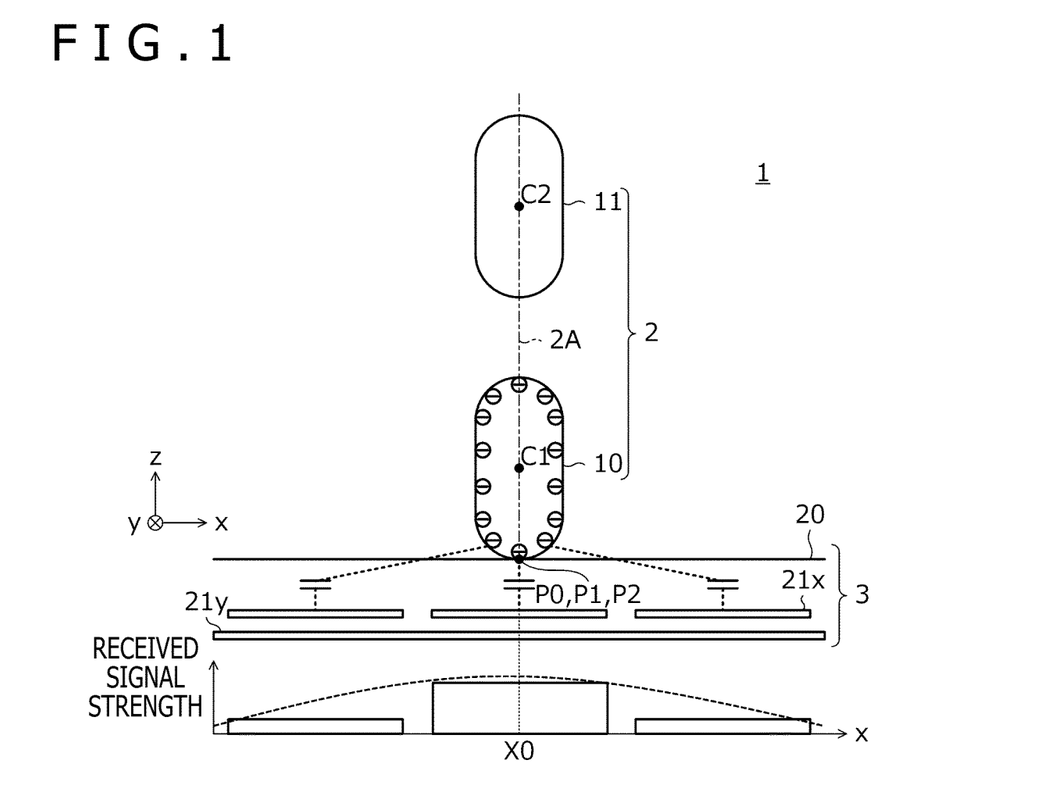
FIG. 1 is a diagram illustrating a system configuration of a position detection system that performs a coordinate detection method according to a first embodiment of the present disclosure.

FIG. 1 is a diagram illustrating a system configuration of a position detection system 1 that performs a coordinate detection method according to a first embodiment of the present disclosure. As illustrated in FIG. 1, the position detection system 1 includes a pen 2 and a position detection device 3.

The pen 2 is a stylus-type device including two electrodes 10 and 11. The electrodes 10 and 11 are disposed inside a housing that is not depicted. It should be noted that components of the pen 2 are not depicted in FIG. 1 and later-referenced FIG. 3 except for the electrodes 10 and 11.

The electrode 10 is a pen tip electrode disposed near a pen tip of the pen 2. The electrode 11 is a sub-electrode that the position detection device 3 uses to detect the tilt of the pen 2. The electrodes 10 and 11 are arranged along a pen axis 2A of the pen 2.

The pen 2 is configured to transmit a pen signal from each of the electrodes 10 and 11. The pen signal transmitted from the electrode 10 includes, for example, an unmodulated burst signal (hereinafter referred to as the "first burst signal") and a data signal in a time-division manner. The first burst signal oscillates at a first frequency. The data signal is modulated by data (including, for example, a pen identification (ID), a pen pressure value detected by a pen pressure sensor that is not depicted, and on/off information regarding a switch that is not depicted) transmitted from the pen 2 to the position detection device 3. Meanwhile, the pen signal transmitted from the electrode 11 includes, for example, an unmodulated burst signal (hereinafter referred to as the "second burst signal") that oscillates at a second frequency different from the first frequency.

The position detection device 3 includes a planar touch surface 20 and a plurality different linear electrodes 21x and 21y. The linear electrodes 21x and 21y are disposed inside the touch surface 20. Typically, the position detection device 3 forms a part of a tablet terminal. In such a case, the touch surface 20 acts as the display surface of the tablet terminal. Alternatively, however, the position detection device 3 may be formed by a digitizer or other device having no display surface, for example.

The plurality of linear electrodes 21x are linearly-shaped electrodes having the same length. The linear electrodes 21x extend in the depicted y-direction (in the depth direction of the drawing) and are arranged in parallel at predetermined intervals in the x-direction. Meanwhile, the plurality of linear electrodes 21y are linearly-shaped electrodes having the same length. The linear electrodes 21y extend in the depicted x-direction and are arranged in parallel at predetermined intervals in the y-direction. Alternatively, however, the plurality of linear electrodes 21x and 21y may be formed by ring-shaped coil electrodes.

Although not depicted, the position detection device 3 includes sensor controllers that are respectively connected to the plurality of linear electrodes 21x and 21y. The sensor controllers are integrated circuits having a computational function. The sensor controllers are configured to acquire coordinates indicating the position of the pen 2 on the touch surface 20 (more specifically, later-described output coordinates P1out) and tilt data indicating the tilt of the pen 2 (more specifically, later-described tilt angle $\theta$ and azimuth angle $\phi$), and supply the acquired data to host processor that is not depicted (e.g., the central processing unit (CPU) of the tablet terminal). Later-described processes performed by the position detection device 3 are, more specifically, performed by the sensor controllers.

While the pen tip of the pen 2 is in contact with the touch surface 20, capacitance is generated between the electrode 10 and several linear electrodes 21x positioned near the electrode 10 as depicted in FIG. 1. Although not depicted, the same applies to the linear electrodes 21y. Further, the same holds true for the electrode 11 as well. The pen signals transmitted from the electrodes 10 and 11 reach the linear electrodes 21x and 21y through the capacitance and are supplied to the above-described sensor controllers. The position detection device 3 acquires the received signal strength of the pen signals in the plurality of linear electrodes 21x and 21y by detecting the strength of the pen signals supplied in the above manner.

FIG. 1 schematically depicts the received signal strength of each of three depicted linear electrodes 21x that is acquired by the position detection device 3. Based on the received signal strength of the first burst signal in each linear electrode 21x, the position detection device 3 generates a first approximate curve indicating the distribution of x-direction signal levels, detects the x-coordinate of a point where the value of the first approximate curve is maximized, and regards the detected x-coordinate as the x-component of detected coordinates P1 corresponding to the position of the electrode 10 in the plane of the touch surface 20. Further, based on the received signal strength of the second burst signal in each linear electrode 21x, the position detection device 3 generates a second approximate curve indicating the distribution of x-direction signal levels, detects the x-coordinate of a point where the value of the second approximate curve is maximized, and regards the detected x-coordinate as the x-component of detected coordinates P2 corresponding to the position of the electrode 11 in the plane of the touch surface 20. Although not depicted, the position detection device 3 acquires the y-component of each of the detected coordinates P1 and P2 by performing the same processing on the y-direction.

Having acquired the detected coordinates P1 and P2 in the above-described manner, the position detection device 3 further performs a process of acquiring tilt data indicating the tilt of the pen 2 and a coordinate detection process for acquiring output coordinates P1out to be supplied to the host processor. These processes are sequentially described in detail below.

Figure 2:
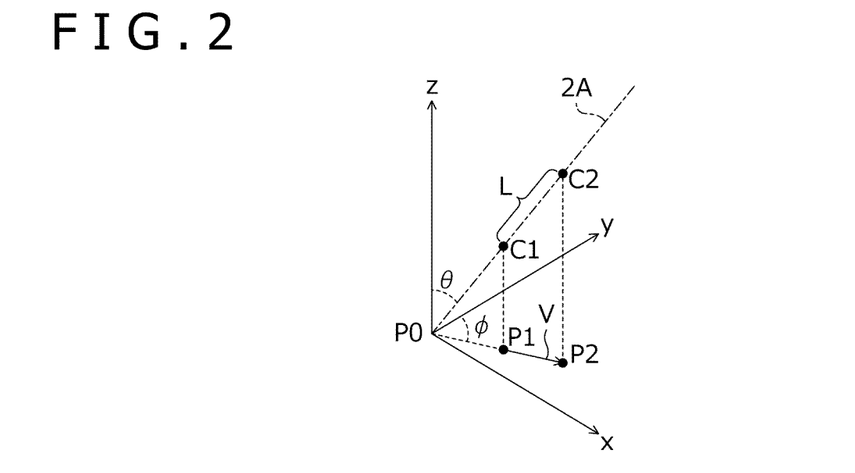
FIG. 2 is a diagram three-dimensionally illustrating the relation between a pen axis and x-, y-, and z-axes respectively corresponding to x-, y-, and z-directions.

FIG. 2 is a diagram three-dimensionally illustrating the relation between the pen axis 2A and x-, y-, and z-axes respectively corresponding to x-, y-, and z-directions. Although various types of tilt data may be used, the tilt data according to the present embodiment includes at least one of a tilt vector V, a tilt angle $\theta$, and an azimuth angle $\phi$, which are depicted in FIG. 2. The tilt vector V is a vector that starts at position P1 and ends at position P2. The tilt angle $\theta$ is an angle formed between the z-axis and the pen axis 2A of the pen 2, and is a value within the range of 0° to 90°. The azimuth angle $\phi$ is an angle formed between the tilt vector V and the y-axis, and is a value within the range of 0° to 360°. Further, when the length |V| of the tilt vector V is equal to 0 (i.e., when the pen 2 is perpendicular to the touch surface 20), it is preferred that the azimuth angle ϕ be equal to a predetermined value such as 0°.

A method of deriving the tilt angle θ will now be described in detail. A distance L depicted in FIG. 2 is the distance between a center point C1 of the electrode 10 and a center point C2 of the electrode 11. The position detection device 3 stores beforehand the distance L regarding each pen type indicated by a pen ID, and acquires the distance L according to the pen ID received from the pen 2. Then, based on the acquired distance L and the length |V| of the tilt vector V, the position detection device 3 derives the tilt angle θ by using the following equation (1).

$$\theta = 90° - \cos^{-1}(|V|/L) \tag{1}$$

Returning to the example depicted in FIG. 1, the pen 2 is perpendicular to the touch surface 20. In such a case, the x-components of the detected coordinates P1 and P2 are both equal to an x-component X0 of the coordinates P0 of a position of contact between the pen 2 and the touch surface 20. Although not depicted, the same holds true for the y-components of the detected coordinates P1 and P2. Therefore, the tilt angle θ derived by the position detection device 3 is 0. Further, as the length |V| of the tilt vector V is equal to 0, the position detection device 3 substitutes the abovementioned predetermined value for the azimuth angle ϕ.

Figure 3:
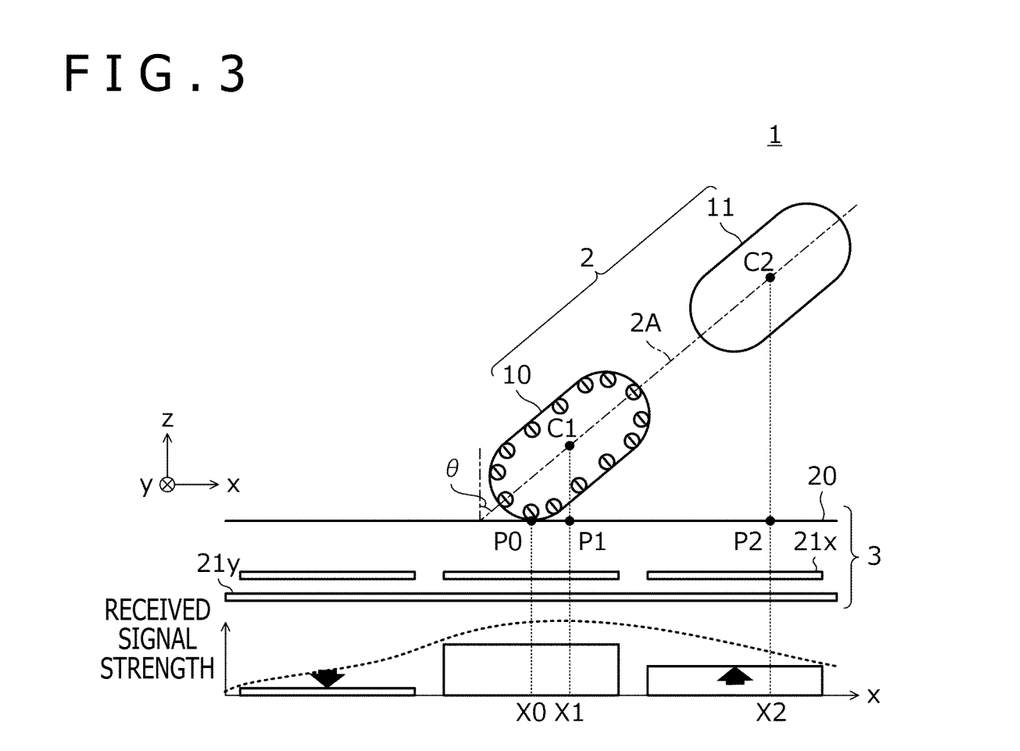
FIG. 3 is a diagram illustrating an example in which a pen is tilted in the x-direction with respect to a touch surface.

FIG. 3 is a diagram illustrating an example case where the pen 2 is tilted in the x-direction with respect to the touch surface 20. In this case, as depicted in FIG. 3, the values of the x-components X1 and X2 of the detected coordinates P1 and P2 are different from the value of the x-component X0 of the coordinates P0 of the position of contact between the pen 2 and the touch surface 20. Meanwhile, although not depicted, the values of the y-components of the detected coordinates P1 and P2 are both equal to the value of the y-component of the coordinates P0. Therefore, the value of the tilt angle θ derived by the position detection device 3 is not 0, and the azimuth angle ϕ is 90° or 270°.

The coordinate detection process for acquiring the output coordinates P1out to be supplied to the host processor will now be described. First of all, the coordinate detection process according to a background art of the present disclosure will be described. Then, after a problem with the background art is clarified, the coordinate detection process according to the present embodiment will be described in detail.

Figure 9:
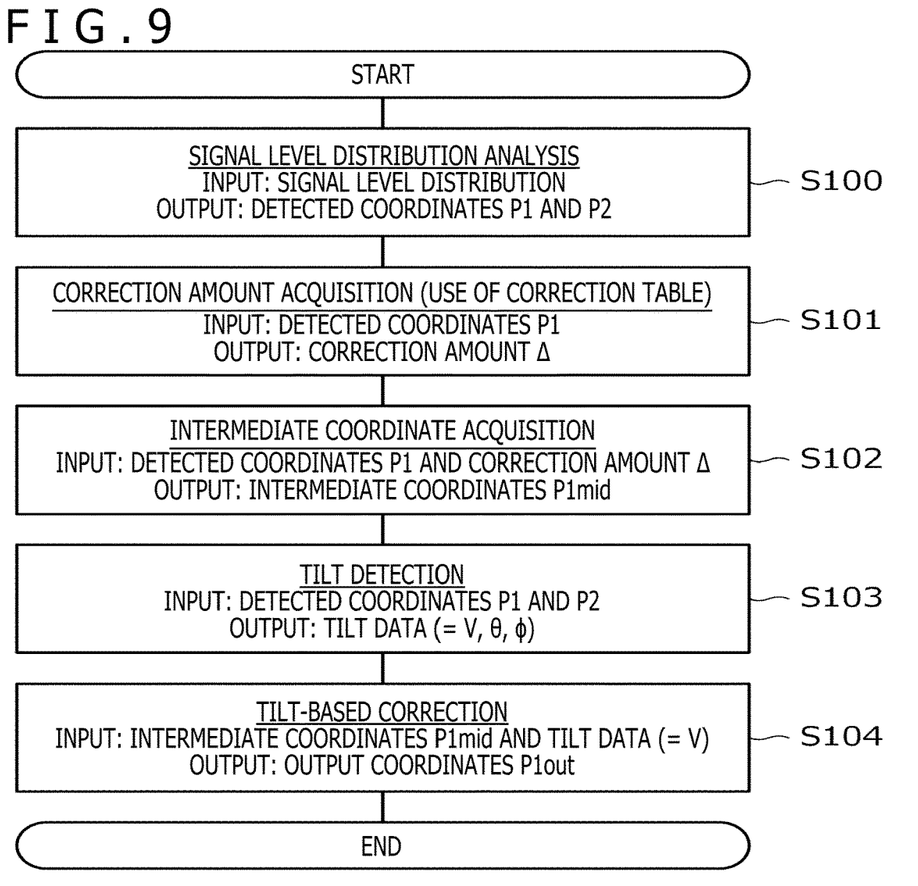
FIG. 9 is a diagram illustrating a coordinate detection process performed by a position detection device invented by the inventors of the present application and not publicly known at the time of filing the present application.

FIG. 9 is a diagram illustrating the coordinate detection process performed by the position detection device according to the background art of the present disclosure. It should be noted that the processing illustrated in FIG. 9 was invented by the inventors of the present application and is not publicly known at a point of time when the present application is filed. As depicted in FIG. 9, the position detection device according to the background art first makes a signal level distribution analysis where signal level distribution is inputted and the detected coordinates P1 and P2 are outputted (S100). The details of this processing are as described earlier.

Next, the position detection device performs a correction amount acquisition process where the detected coordinates P1 are inputted and a correction amount Δ is outputted (S101). This process is for correcting the fluctuations induced in the detected coordinates by the positions and shapes of the linear electrodes 21x and 21y, and is performed by using a correction table pre-stored in the position detection device.

Figure 10:
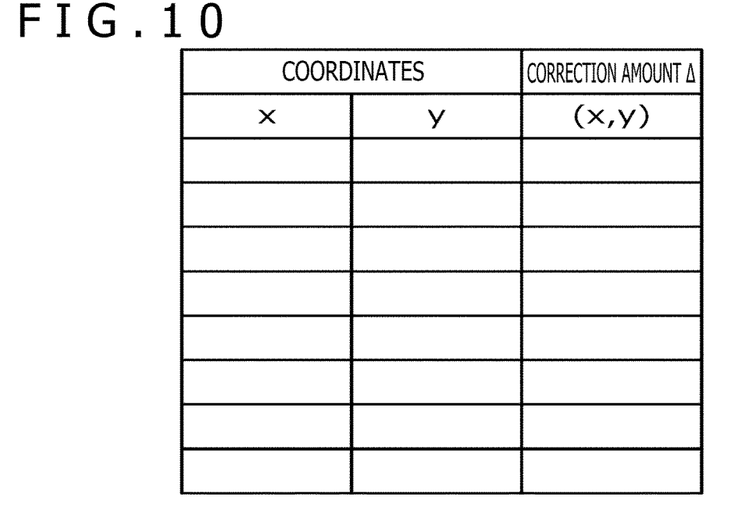
FIG. 10 is a diagram illustrating a correction table used at S101 of FIG. 9.

FIG. 10 is a diagram illustrating the correction table used at S101 of FIG. 9. As depicted in FIG. 10, the correction table defines the correspondence between the coordinates and the correction amount Δ. The position detection device acquires the correction amount Δ by accessing the correction table to read the correction amount Δ that corresponds to coordinates closest to the detected coordinates P1. It should be noted that the correction amount Δ is vector data having the x- and y-components as depicted in FIG. 10. The position detection device may alternatively acquire the correction amount Δ by accessing the correction table, reading two or more correction amounts Δ corresponding to two or more coordinates close to the detected coordinates P1, and interpolating between the read correction amounts Δ.

Returning to FIG. 9, the position detection device then performs an intermediate coordinate acquisition process where the detected coordinates P1 and the correction amount Δ are inputted and intermediate coordinates P1mid are outputted (S102). In short, this process moves the detected coordinates P1 on the xy plane by an amount indicated by the correction amount Δ.

Next, the position detection device performs a tilt detection process where the detected coordinates P1 and P2 are inputted and the tilt data including the tilt vector V, the tilt angle θ, and the azimuth angle ϕ is outputted (S103). The details of this process are also as described earlier. The tilt angle θ and the azimuth angle ϕ which are included in the tilt data acquired at in S103 are supplied from the position detection device to the abovementioned host processor.

Finally, the position detection device performs a process (tilt-based correction process) where the intermediate coordinates P1mid and the tilt data (more specifically, the tilt vector V) are inputted and the output coordinates P1out are outputted (S104). The processing performed at S104 is for bringing the detected coordinates P1 close to the coordinates P0 (see FIG. 3) of a position that the pen tip is in actual contact with. The position detection device acquires an offset vector by multiplying the inverse vector of the tilt vector V by a predetermined offset ratio (e.g., 0.08), and moves the intermediate coordinates P1mid on the xy plane by an amount indicated by the offset vector, in order to derive the output coordinates P1out. Alternatively, the offset ratio may be a value that is obtained by substituting the length |V| of the tilt vector V for a predetermined function. The output coordinates P1out obtained at S104 are also supplied from the position detection device to the abovementioned host processor.

The processing according to the background art has been described above. However, it may cause a problematic situation where a significant error occurs in the correction amount Δ outputted at S101. More specifically, as described above, although an error (an error in the coordinates P0) occurs in the detected coordinates P1 when the pen 2 is tilted, the background art references the correction table according to such erroneous coordinates. This results in a significant error in the correction amount Δ outputted from the correction table.

Meanwhile, instead of the correction table depicted in FIG. 10, the present embodiment uses a correction table that defines the correspondence between the correction amount Δ and the combination of coordinates and tilt data. This reduces an error that occurs in the correction amount Δ due to the tilt of the pen 2. The processing according to the present embodiment is described in detail below.

Figure 4:
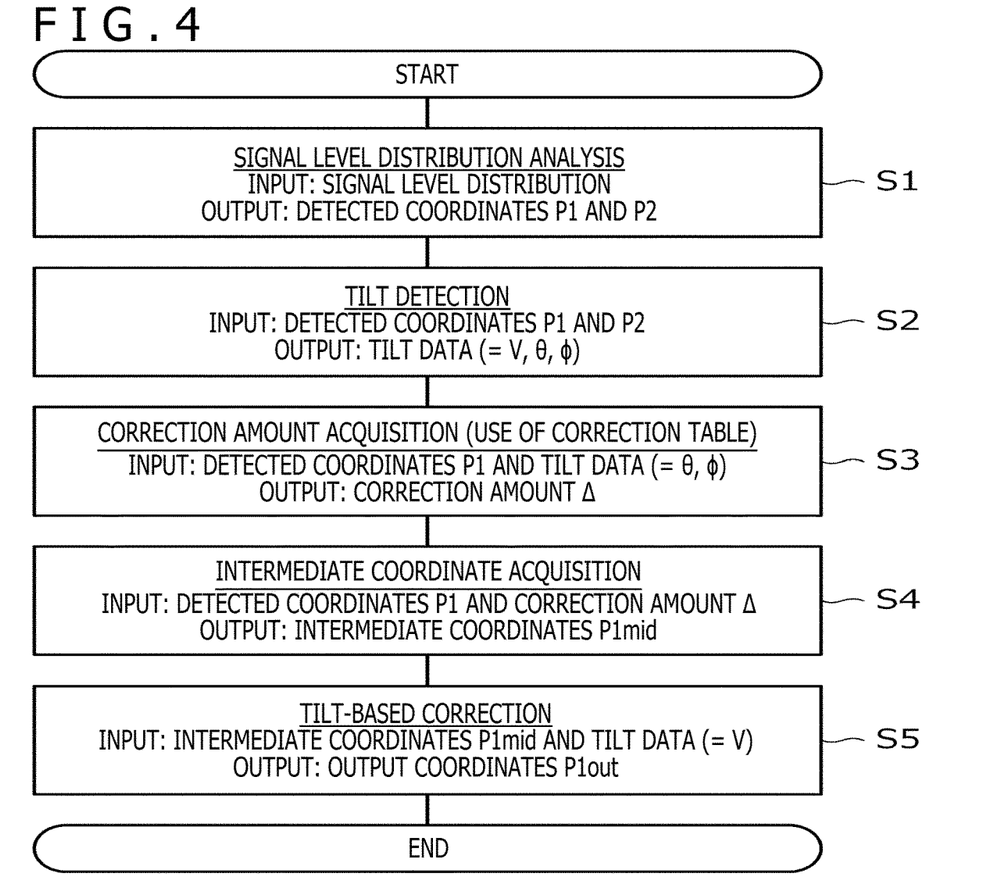
FIG. 4 is a diagram illustrating a coordinate detection process that is performed by a position detection device according to the first embodiment of the present disclosure.

FIG. 4 is a diagram illustrating the coordinate detection process that is performed by the position detection device 3 according to the present embodiment. It should be noted that S1, S2, S4, and S5, which are among individual processes depicted in FIG. 4, are respectively the same as S100, S103, S102, and S104 depicted in FIG. 9.

After performing S1 (coordinate detecting), the position detection device 3 according to the present embodiment first performs a tilt detection process to acquire the tilt data including the tilt vector V, the tilt angle θ, and the azimuth angle φ (S2 (tilt detecting)).

Next, the position detection device 3 performs a correction amount acquisition process where the detected coordinates P1 and the tilt data (more specifically, the tilt angle θ and the azimuth angle φ) are inputted and the correction amount Δ is outputted (S3 (correction amount acquiring)). As is the case with S101, which has been described with reference to FIG. 9, the above processing is for correcting the fluctuations induced in the detected coordinates by the positions and shapes of the linear electrodes 21x and 21y, and is performed by using the correction table pre-stored in the position detection device 3. However, the above processing differs from S101 in that the tilt data is additionally inputted.

Figure 5:
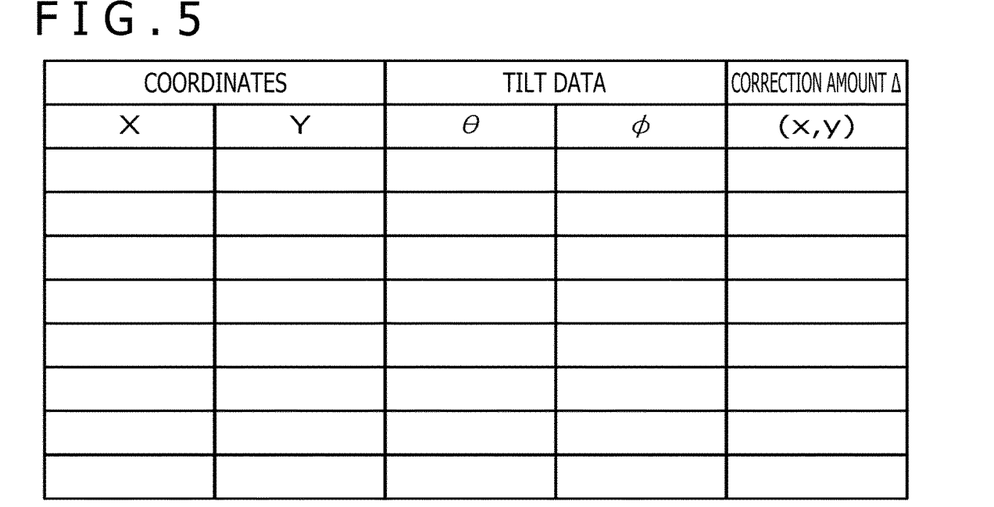
FIG. 5 is a diagram illustrating a correction table used at S3 of FIG. 4.

FIG. 5 is a diagram illustrating the correction table used at S3 of FIG. 4. As depicted in FIG. 5, the correction table defines the correspondence between the coordinates and the tilt data (more specifically, the tilt angle θ and the azimuth angle φ). The position detection device 3 is configured to reference the correction table in order to acquire the correction amount Δ corresponding to the combination of the detected coordinates P1 (acquired at S1) and the tilt data (acquired at S2).

Returning to FIG. 4, after acquiring the correction amount Δ, the position detection device 3 acquires the intermediate coordinates P1mid by performing the intermediate coordinate acquisition process (S4), and then acquires the output coordinates P1out by performing the tilt-based correction process (S5 (output coordinate acquiring)).

As described earlier, the position detection device 3 according to the present embodiment performs the coordinate detection process by using the correction table defining the correspondence between the correction amount and the combination of coordinates and tilt data instead of using the correction table defining the correspondence between the coordinates and the correction amount. Therefore, the correction amount Δ can be derived in additional consideration of the tilt data. This makes it possible to reduce an error that occurs in the correction amount Δ due to the tilt of the pen 2.

Further, the present embodiment has been described with reference to an example where the tilt angle θ and the azimuth angle φ are used as the "tilt data" to be stored in the correction table. However, for example, the detected coordinates P2 may alternatively be used as the tilt data. As described earlier, the tilt angle θ and the azimuth angle φ are determined from the detected coordinates P1 and P2. Therefore, using the above alternative method also makes it possible to reduce an error that occurs in the correction amount Δ due to the tilt of the pen 2, as is the case with the present embodiment.

The coordinate detection method according to a second embodiment of the present disclosure will now be described. The coordinate detection method according to the present embodiment is similar to the coordinate detection method according to the first embodiment in that the coordinate detection method is performed by the position detection system 1 depicted in FIG. 1. However, the coordinate detection method according to the present embodiment differs from that according to the first embodiment in the details of the coordinate detection process performed by the position detection device 3. The present embodiment is described below with reference mainly to the difference from the first embodiment while the same elements and processing as those of the first embodiment are designated by the same reference numerals as their counterparts.

Figure 6:
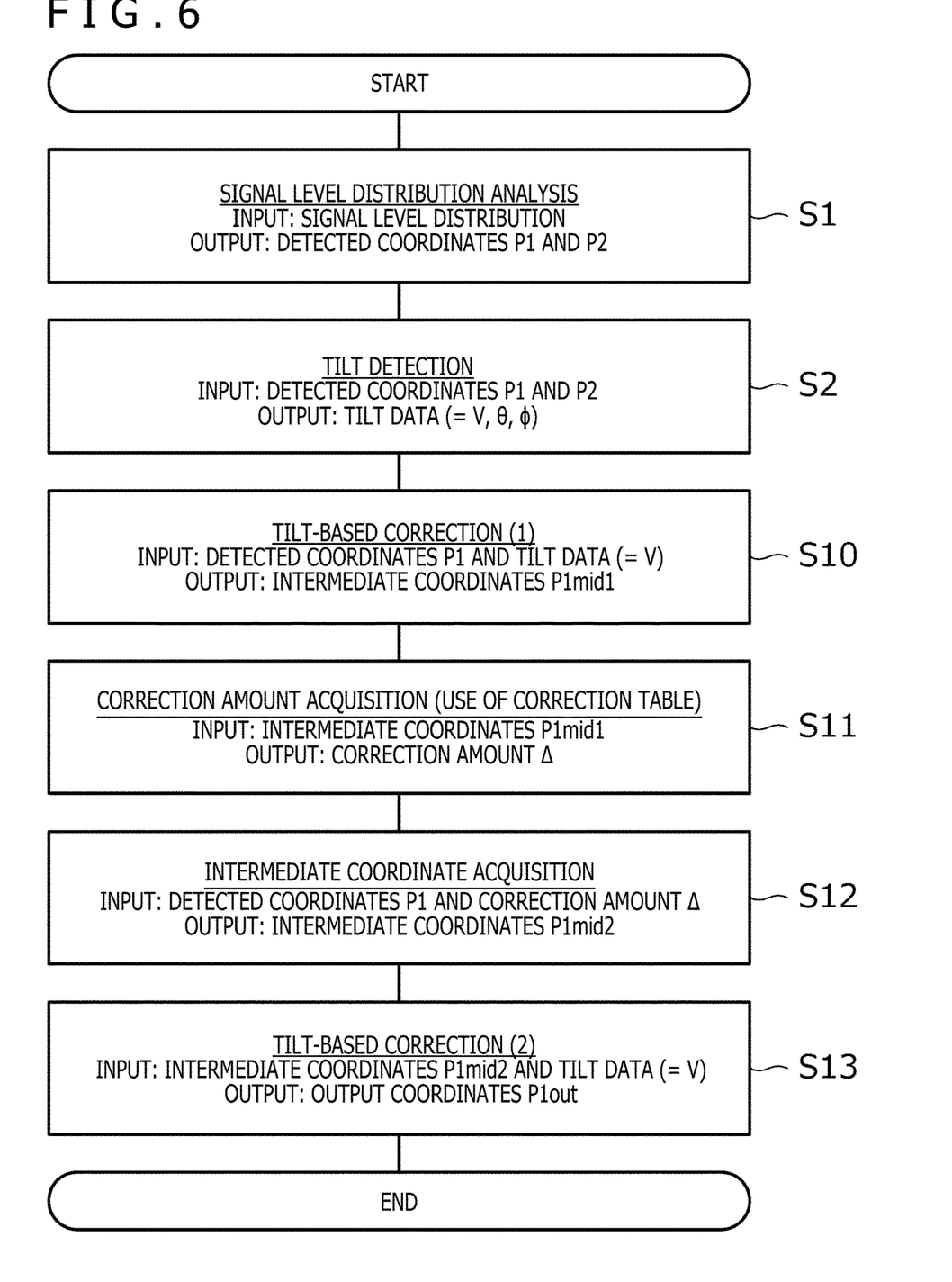
FIG. 6 is a diagram illustrating the coordinate detection process that is performed by the position detection device according to a second embodiment of the present disclosure.

FIG. 6 is a diagram illustrating the coordinate detection process that is performed by the position detection device 3 according to the present embodiment. For ease of understanding when FIG. 6 is compared with FIG. 4, the coordinate detection process according to the present embodiment is described by replacing S3 to S5 by S10 to S13.

At S10, the position detection device 3 performs a process (intermediate coordinate acquiring) where the detected coordinates P1 and the tilt data (more specifically, the tilt vector V) are inputted and intermediate coordinates P1mid1 are outputted. This processing is for tilt-based correction (first processing) and is basically similar to S5 of FIG. 4. However, it is preferred that this processing be performed to acquire a compensation vector and move the detected coordinates P1 on the xy plane by an amount indicated by the compensation vector, in order to derive the intermediate coordinates P1mid1. The compensation vector is obtained by further multiplying the abovementioned offset vector by a predetermined compensation ratio (e.g., 0.5). Alternatively, the compensation ratio may be a value that is obtained by substituting the length of the offset vector for a predetermined function.

Processing performed at S11 is similar to the correction amount acquisition process (correction amount acquiring) performed at S101 depicted in FIG. 9. Therefore, the present embodiment uses the correction table depicted in FIG. 10. However, the processing at S11 differs from the processing at S101 of FIG. 9 in that the intermediate coordinates P1mid1 are inputted instead of the detected coordinates P1. As the intermediate coordinates P1mid1 subjected to tilt-based correction are inputted, the error in the correction amount Δ outputted at S11 is smaller than the error in the correction amount Δ outputted at S101.

Processing performed at S12 is similar to the intermediate coordinate acquisition process performed at S4 depicted in FIG. 4. However, the processing at S12 differs from the processing at S4 of FIG. 4 in that intermediate coordinates P1mid2 are outputted instead of the intermediate coordinates P1mid.

Processing performed at S13 is similar to the tilt-based correction process (second processing) performed at S5 depicted in FIG. 4. However, the processing at S13 differs from the processing at S5 of FIG. 4 in that the intermediate coordinates P1mid2 are inputted instead of the intermediate coordinates P1mid. When the processing described thus far is performed, the output coordinates P1out are acquired as is the case with FIG. 4.

According to the coordinate detection process performed by the position detection device 3 according to the present embodiment, the detected coordinates P1 are corrected based on the tilt data at a stage prior to referencing the correction table (at S10) as described above. Therefore, a more suitable correction amount Δ can be read from the correction table. This makes it possible to reduce an error that occurs in the correction amount Δ due to the tilt of the pen 2.

Further, according to the present embodiment, the correction table does not need to include the tilt data although it is possible to reduce an error that occurs in the correction amount Δ due to the tilt of the pen 2. Therefore, the present embodiment is able to make the size of the correction table smaller than the first embodiment.

Table 1 below illustrates concrete examples of methods of deriving, for instance, the coordinates and vectors and their values which are acquired by the coordinate detection process according to the present embodiment. However, the values in Table 1 are expressed in a one-dimensional notation in order to facilitate understanding. According to the one-dimensional notation, vector directions are expressed by the sign of a vector-indicating value. Further, Table 1 expresses the correction table by function f( ), a function for determining the offset ratio by g( ), and a function for determining the compensation ratio by h0.

TABLE 1

| Type | Derivation method | Value |
| --- | --- | --- |
| Detected coordinates | P1 | +1,250 |
| Detected coordinates | P2 | +1,000 |
| Tilt vector | V = P2 − P1 | −250 |
| Offset ratio | g(|V|) | 0.08 |
| Offset vector | g(|V|) · (−V) | +20 |
| Compensation ratio | h(|g(|V|) · (−V)|) | 0.5 |
| Compensation vector | h(|g(|V|) · (−V)|) · g(|V|) · (−V) | +10 |
| Intermediate coordinates | P1mid1 = P1 + h(|g(|V|) · (−V)|) · g(|V|) · (−V) | +1,260 |
| Correction amount | Δ = f(P1mid1) | +50 |
| Intermediate coordinates | P1mid2 = P1 + Δ | +1,300 |
| Output coordinates | P1out = P1mid2 + g(|V|) · (−V) | +1,320 |

Figure 7A:
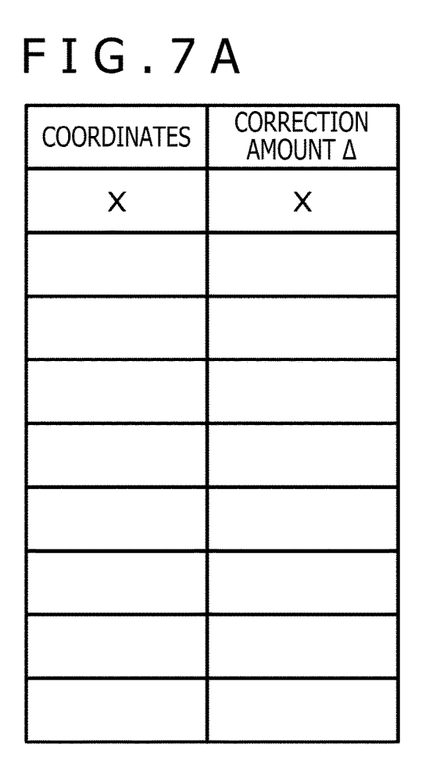
FIGS. 7A and 7B are diagrams illustrating a one-dimensional input/one-dimensional output table that defines the one-dimensional correspondence between coordinates and correction amounts.
Figure 7B:
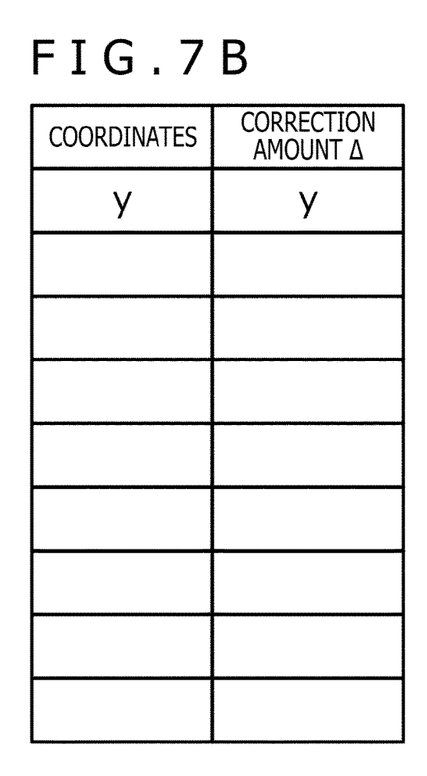

It should be noted that the correction table used in the present embodiment defines the correspondence between two-dimensional coordinates and the correction amount Δ which is two-dimensional vector data. However, an alternative is to provide each of x- and y-directions with a one-dimensional input/one-dimensional output table defining the one-dimensional correspondence between coordinates and correction amounts as depicted in FIGS. 7A and 7B, determine the x-component of the correction amount Δ from the x-coordinate of input coordinates, and determine the y-component of the correction amount Δ from the y-coordinate of the input coordinates. This makes it possible to reduce the data size of the correction table.

Further, it is not always necessary to prepare the correction table for all coordinates of the touch surface. This matter is described in detail below.

Figure 8:
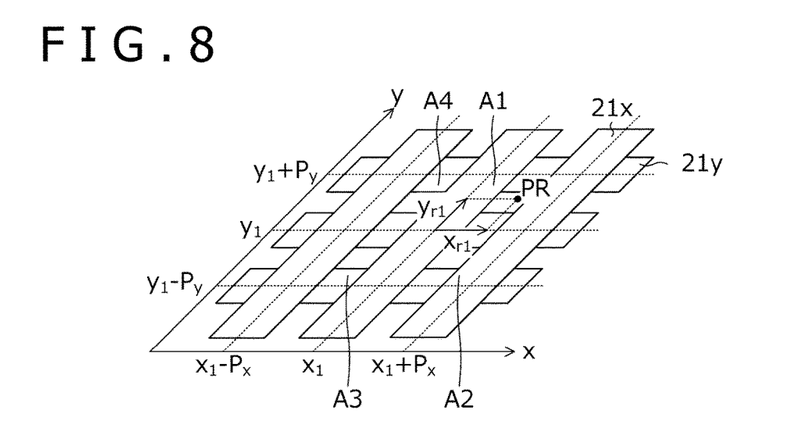
FIG. 8 is a perspective view illustrating three of a plurality of pieces of different linear electrodes.

FIG. 8 is a perspective view illustrating three of a plurality of pieces of different linear electrodes $21x$ and $21y$. As illustrated in FIG. 8, the linear electrodes $21x$ are arranged at intervals $P_x$, and the linear electrodes $21y$ are arranged at intervals $P_y$. When the x-coordinate of the central one of the three linear electrodes $21x$ is assumed to be $x_1$, the x-coordinates of the other two linear electrodes $21x$ are expressed as $x_1-P_x$ and $x_1+P_x$, respectively. Similarly, when the y-coordinate of the central one of the three linear electrodes $21y$ is assumed to be $y_1$, the y-coordinates of the other two linear electrodes $21y$ are expressed as $y_1-P_y$ and $y_1+P_y$, respectively.

When, in the above instance, an area expressed by $x_1 \leq x \leq x_1+P_x$ and $y_1 \leq y \leq y_1+P_y$ is referred to as a first quadrant A1, an area expressed by $x_1 \leq x \leq x_1+P_x$ and $y_1-P_y \leq y \leq y_1$ is referred to as a second quadrant A2, an area expressed by $x_1-P_x \leq x \leq x_1$ and $y_1-P_y \leq y \leq y_1$ is referred to as a third quadrant A3, and an area expressed by $x_1-P_x \leq x \leq x_1$ and $y_1 \leq y \leq y_1+P_y$ is referred to as a fourth quadrant A4, it is conceivable that the fluctuations of detected coordinates in each of the above four quadrants have a point-symmetric shape centered around coordinates $(x_1, y_1)$ determined based on the intervals. Therefore, when the correction table includes relative coordinates (e.g., depicted coordinates $PR=(x_{r1}, y_{r1})$) from the coordinates $(x_1, y_1)$ of one of the four quadrants (an area corresponding to the intervals $P_x$ and $P_y$) and the resulting correction table is used for each quadrant, the data size of the correction table can be reduced to ¼.

Further, when the above idea is extended to the whole touch surface 20, it is understood that the whole touch surface 20 can be covered by the correction table including the relative coordinates of one of the four quadrants depicted in FIG. 8. Therefore, using such a correction table makes it possible to further reduce the data size of the correction table. Alternatively, the one-dimensional input/one-dimensional output table depicted in FIG. 7 may be configured as the correction table. Adopting such an alternative configuration makes it possible to further reduce the data size of the correction table.

While the foregoing embodiments of the present disclosure have been described above as preferred embodiments, it will be apparent to those skilled in the art that the present disclosure is not limited to the foregoing embodiments and can be practiced in various aspects without departing from the scope and spirit thereof.

For example, the position detection device 3 according to the foregoing embodiments achieves coordinate detection based on the received signal strength of the pen signals in the linear electrodes $21x$ and $21y$ when the pen signals are transmitted from the pen 2. However, the present disclosure is also applicable to a case where the position detection device 3 detects the coordinates of the pen 2 by using, for example, the earlier mentioned signals for finger touch detection.

Further, in the foregoing embodiments, the pen 2 has two electrodes 10 and 11, and the position detection device 3 acquires the tilt data based on the received signal strength of the pen signals transmitted respectively from the electrodes 10 and 11. However, an alternative is to incorporate, for example, a gyro sensor in the pen 2, detect at least part of the tilt data by using the gyro sensor, and transmit the above-mentioned data signal representative of the detected data from the pen 2 to the position detection device 3.

Further, the tilt-based correction at S5 of FIG. 4 and at S13 of FIG. 6 may alternatively be parallax correction described, for example, in Japanese Patent Laid-open No. Hei 7-152475 (correction for compensating for the difference that is caused between a touch position and detected coordinates due to the parallax of a user). In each of the foregoing embodiments, the correction reflecting the tilt is also made at S3 and S10. Therefore, the input coordinates at S5 and S13 are already subjected to a certain degree of tilt-based correction. Consequently, even if the tilt-based correction is not made at S5 and S13, it is possible to acquire the output coordinates that are already subjected to a certain degree of reduction of a tilt-induced error. Moreover, when the parallax correction is made at S5 and S13, coordinates already subjected to the reduction of the tilt-induced error can be inputted for the parallax correction. This makes it possible to increase the accuracy of parallax correction as well. An alternative is to separately make the parallax correction after completion of S5 and S13. This makes it possible to further increase the accuracy of parallax correction.

What is claimed is:

1. A coordinate detection method comprising:
   detecting coordinates corresponding to a position of a pen tip electrode of a pen by detecting a distribution of signal levels in a plane of a touch surface through use of a plurality of linear electrodes disposed in the plane of the touch surface;

detecting tilt data indicating a tilt of the pen;

acquiring intermediate coordinates by correcting the coordinates corresponding to the position of the pen tip electrode of the pen according to the tilt data; and acquiring a correction amount corresponding to the intermediate coordinates by referencing a correction table defining a correspondence between coordinates and correction amounts.

2. The coordinate detection method according to claim 1, wherein the linear electrodes are arranged in parallel at predetermined intervals, and the correction table defines a one-dimensional correspondence between correction amounts and relative coordinates from coordinates determined based on the predetermined intervals.

3. The coordinate detection method according to claim 2, wherein the correction table includes relative coordinates of areas corresponding to the predetermined intervals.

4. The coordinate detection method according to claim 1, further comprising:

obtaining second intermediate coordinates by correcting the coordinates corresponding to the position of the pen tip electrode of the pen using the correction amount; and acquiring output coordinates by correcting the second intermediate coordinates according to the tilt data.

5. The coordinate detection method according to claim 4, wherein the correcting the second intermediate coordinates according to the tilt data includes making a parallax correction.

* * * * *